United States Patent [19]

Hayashida et al.

[11] 4,074,532
[45] Feb. 21, 1978

[54] HYDRAULIC MASTER CYLINDER

[75] Inventors: Yoshihiro Hayashida, Chigasaki; Tetsuo Haraikawa, Funabashi, both of Japan

[73] Assignee: Tokico Ltd., Japan

[21] Appl. No.: 658,662

[22] Filed: Feb. 17, 1976

[30] Foreign Application Priority Data

Feb. 18, 1975 Japan .................... 50-20109

[51] Int. Cl.² .................................... B60T 11/20
[52] U.S. Cl. .................................... 60/562; 60/581; 92/63; 403/310
[58] Field of Search .................... 60/562, 581, 592; 92/62, 63, 129, 167; 403/309, 310, 311

[56] References Cited

U.S. PATENT DOCUMENTS

| 34,769 | 3/1862 | Northrup | 403/310 |
|---|---|---|---|
| 1,769,967 | 7/1930 | Saurman | 403/309 |
| 1,831,765 | 11/1931 | Gouverneur | 403/310 |
| 2,190,228 | 2/1940 | Bowen | 92/129 |
| 3,413,030 | 11/1968 | Drake | 403/310 |
| 3,473,329 | 10/1969 | Eggstein | 60/581 |
| 3,922,858 | 12/1975 | Sadler | 60/581 |

FOREIGN PATENT DOCUMENTS

356,961 2/1938 Italy .................... 403/310

*Primary Examiner*—Martin P. Schwadron
*Assistant Examiner*—Abraham Hershkovitz
*Attorney, Agent, or Firm*—Wenderoth, Lind & Ponack

[57] ABSTRACT

A master cylinder has a first piston and a second piston slidably disposed respectively in two piston chambers of different diameters, reduced diameter stems projecting from the opposing end portions of the pistons respectively, a flange formed around the outer periphery of each of the stems, and a split sleeve consisting of two or more co-operating elements and having stepped portions in the inner circumference thereof at the opposite ends respectively, the split sleeve being restrained in a cylindrical shape with the stepped portions engaging with respective flanges thereby connecting the two pistons with each other.

4 Claims, 2 Drawing Figures

HYDRAULIC MASTER CYLINDER

This invention relates to master cylinders for use in hydraulic braking systems of motor vehicles or the like.

A prior art master cylinder for use in a hydraulic braking system of a motor vehicle comprises first and second pistons slidably disposed respectively in two coaxial piston chambers having different diameters and communicating with each other to supply oil under pressure to two separate hydraulic circuits simultaneously. The master cylinder of this type has shortcomings such that it is difficult to fabricate the two piston chambers so that they are aligned precisely with each other, and thus the pistons will not work properly due to misalignment of the piston chambers and/or of the pistons. It has been proposed to connect the two pistons or piston rods of respective pistons with a pin to permit a small amount of relative displacement in the radial direction so as to compensate for the misalignment of the piston chambers and/or the pistons. However, when failure occurs in one of the hydraulic circuits, the pin connecting the two pistons (or piston rods) will be damaged by excessive tension or compression.

The present invention provides a master cylinder comprising coupling means for connecting two pistons (or piston rods) with ample strength and permitting radial displacement therebetween.

According to the present invention there provided a master cylinder comprising a first piston and a second piston slidably disposed respectively in two piston chambers of different diameters, reduced diameter stems projecting from the opposing end portions of the pistons respectively, a flange formed around the outer periphery of each of the stems, and a split sleeve consisting of two or more co-operating elements and having stepped portions in the inner circumference thereof at the opposite ends respectively, said split sleeve being restrained in a cylindrical shape with the stepped portions engaging with respective flanges thereby connecting said two pistons with each other.

Preferably the co-operating elements of the split sleeve are two halves, but it is possible to form the split sleeve from three or more equally shaped co-operating elements.

The split sleeve may easily be retained in its position by surrounding the outer circumference thereof by one or more annular members or sleeve members.

An embodiment of the present invention is illustrated by way of example in the accompanying drawing in which.

Figure 1:
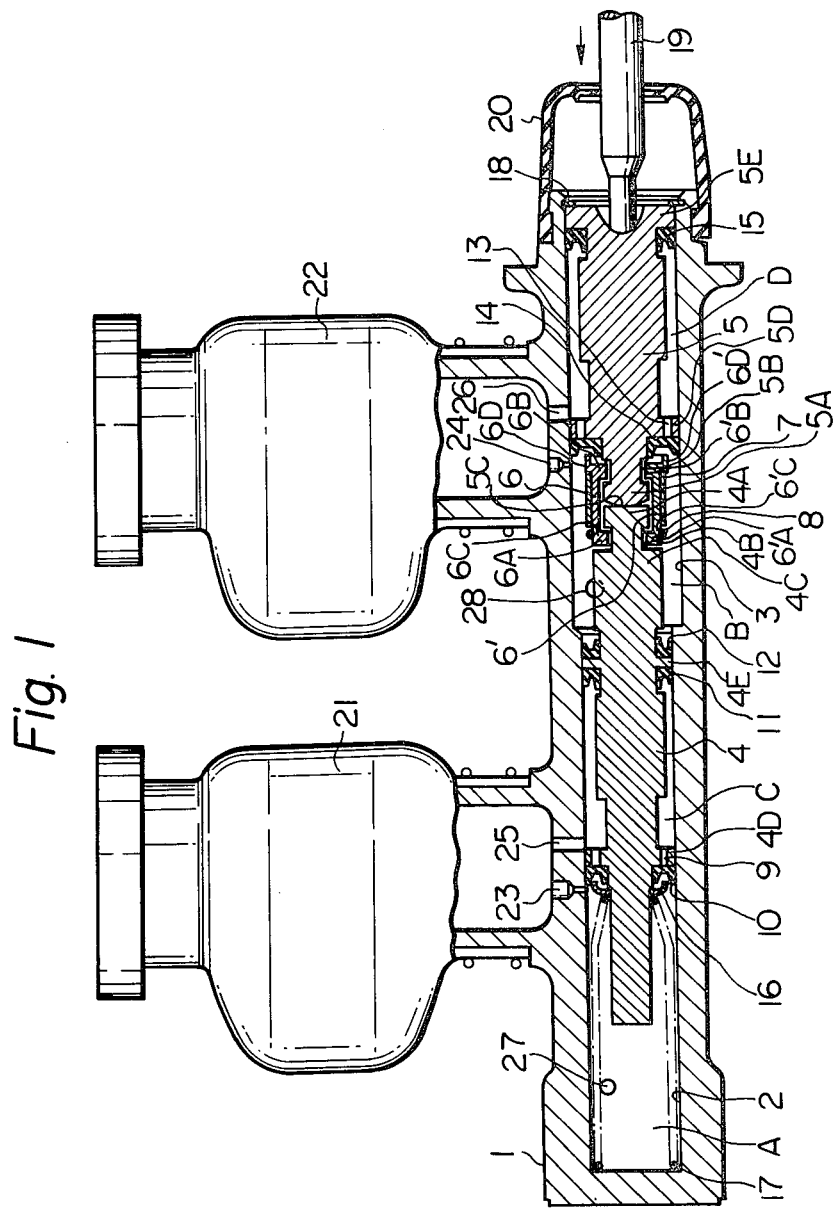
FIG. 1 is a longitudinal cross-section of a tandem master cylinder.
Figure 2:
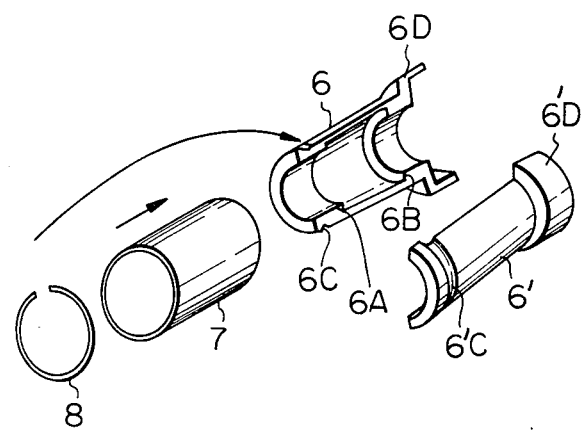
FIG. 2 is an exploded perspective view of coupling means or a coupling assembly.

As shown in FIG. 1, a cylinder body 1 has a first piston chamber 2 and a second piston chamber 3 aligned with each other and having different inner diameters. A first piston 4 is slidably disposed in the first piston chamber 2, and an oil chamber A is defined between the first piston 4 and the inner end wall of the first piston chamber 2. A second piston 5 is slidably disposed in the second piston chamber 3, and an oil chamber B is defined between the first piston 4 and the second piston 5.

Opposing ends of the first piston 4 and the second piston 5 are connected by means of a coupling assembly comprising a split sleeve consisting of two co-operating halves 6 and 6', a sleeve member 7 and a clip 8.

Reduced diameter stems 4A and 5A project from the opposing end portions of the first piston 4 and the second piston 5, and have grooves 4A and 5A respectively on the free ends thereof for loosely receiving inturned flanges 6A and 6B and 6'A and 6'B formed at the opposite ends of the split sleeve halves 6 and 6'. The co-operating halves or half elements 6 and 6' of the split sleeve form a cylindrical shape when they are assembled in their proper positions. The sleeve member 7 which has been fitted on a stem portion 4C of the first piston 4 beforehand is moved axially so as to surround and engage with the outer circumference of the split sleeve halves 6 and 6'. Thereafter, a C-shaped clip 8 is fitted in grooves 6C and 6C' formed in the outer circumference of the sleeve halves 6, and 6', whereby, the sleeve member 7 is retained between the clip 8 and the side surfaces of large diameter portions 6D and 6D' formed on the outer circumference of the split sleeve halves 6 and 6'. Thus, the pistons 4 and 5 are coupled firmly by means of the coupling assembly made up of parts 6, 6', 7 and 8.

The inner diameter of the split sleeve halves 6 and 6' and of the stepped portions 6A and 6B (6'A and 6'B) are slightly larger than the outer diameters of the reduced diameter stems 4A and 5A and of the grooves 4B and 5B of the first and second pistons 4 and 5 respectively, and a small axial clearance is provided between the stepped portions 6A and 6B (6'A and 6'B) of the split sleeve halves 6 and 6' and the grooves 4B and 5B. Further, an end surface 5C of the reduced diameter stem 5A of the second piston 5 which abuts with the end surface of the reduced diameter stem 4A of the first piston 4 is given a spherical configuration.

Thus, the piston 4 can move a small amount in the axial and radial directions relative to the second piston 5.

In the above description the portions 4A and 5A are described as reduced diameter stems and the portions 4B and 5B as grooves, but it is within the scope of the present invention that positions 4B and 5B are reduced diameter stems and portions 4A and 5A are flanges formed at the free ends of the reduced diameter stems 4B and 5B.

Now, a description will be given of the general construction and function of the tandem master cylinder shown in the drawing.

The first piston 4 has flanged portions 4D and 4E, and an oil chamber C is defined in the first piston chamber 2 between the flanged portions 4D and 4E. An oil passage 9 formed in the flanged portion 4D for connecting oil chambers A and C. A cup-shaped primary seal 10 is disposed at one side of the flanged portion 4D for sealing the oil chamber A from the oil chamber C. A secondary seal 11 and a seal 12 are disposed on opposite sides of the flanged portion 4E for sealing the oil chamber B from the oil chamber C.

The second piston 5 has flanged portions 5D and 5E defining an oil chamber D therebetween in the second piston chamber 3. An oil passage 13 connecting the oil chambers B and D is formed in the flanged portion 5D. A cup-shaped primary seal 14 and a secondary seal 15 are fitted on the second piston 5 for providing an oil seal between the oil chambers B and D and between the oil chamber D and the outside respectively.

A coil spring 17 is disposed between the inner end wall of the first piston chamber 2 and a retainer 16 fitted on the first piston 4 for urging the first piston 4 towards the second piston chamber 3. A clip 18 for restricting the outward movement of the second piston 5 is fitted at the open end of the second piston chamber 3. Shown at 19 is an actuating rod connected to a brake pedal (not shown) for actuating the second piston 3. Shown at 20 is a dust cover.

Oil reservoirs 21 and 22 are mounted on the cylinder body 1 respectively. The cylinder body 1 has a relief port 23 for communicating the oil chamber A with the reservoir 21 in the brake released condition, a relief port 24 for communicating the oil chamber B with the reservoir 22 in the brake released condition, a supply port 25 connecting the oil chamber C with the reservoir 21, and a supply port 26 connecting the oil chamber D with the reservoir 22.

Oil chambers A and B are connected with front wheel brake cylinders and rear wheel brake cylinders (now shown) through oil passages 27 and 28, respectively.

In operation, when the brake pedal is depressed the actuating rod 19 moves in the direction of the arrow in FIG. 1 so that the first and second piston 4 and 5 move in the same direction. The primary seal 10 of the first piston 4 will pass the relief port 23 and, then, oil in the oil chamber A will be supplied to the front wheel brake cylinders (not shown) through the oil passage 27 so that pistons (not shown) in the brake cylinders urge friction elements (not shown) against brake drums (not shown). Similarly, oil in the oil chamber B will be supplied to associated brake cylinders (not shown) when the primary seal 14 of the second piston 5 passes the relief port 24, whereby the friction elements of the associated wheel brakes (not shown) will be urged against the brake drums (not shown) by pistons (not shown) in the brake cylinders.

The above function will be performed simultaneously since the first piston 4 is coupled with the second piston 5.

Upon release of the brake, the first piston 4 and the second piston 5 move backward by means of the biassing force of the coil spring 17. Pressure in the oil chambers A and B will be decreased, and the pistons in the brake cylinders will move rearward and the friction elements will be separated from the brake drums.

If there should be a failure in the hydraulic circuit connected to the oil chamber A, oil pressure will be generated only in the oil chamber B applying the brakes, and a large tensile force will act on the coupling means connecting the pistons 4 and 5. However, the coupling means according to the present invention comprises split sleeve halves 6 and 6' connecting the reduced diameter portions 4B and 5B of the pistons 4 and 5 and has ample strength to resist the tensile force. Namely, ample cross-sectional areas can be provided in the split sleeve halves 6 and 6' since they are positioned around the reduced diameter portions 4B and 5B, and the strength of the portions 4B and 5B will have sufficient value since there are no holes therein for receiving pins or the like.

If there should be a failure in hydraulic the circuit connected to the oil chamber B, oil pressure will be generated only in the oil chamber A during accuation of the brakes a compression force will be generated between the pistons 4 and 5, and no problem will occur in the coupling means.

According to the present invention as described hereinbefore, two separate pistons are connected with each other by coupling means comprising a split sleeve so as to allow some amounts of relative radial displacement and it is possible to provide ample strength in the coupling means and, further, a small amount of misalignment between the pistons will not affect the function of the master cylinder and the manufacturing cost of the master cylinder can be reduced.

What is claimed is:

1. A master cylinder construction comprising a cylinder having two piston chambers of different diameters, a first piston and a second piston slidably disposed respectively in said piston chambers, reduced diameter stems projecting from the opposing end portions of the pistons, respectively, a flange formed around the outer periphery of each of the stems, one of said stems having a substantially spherical end surface abutting the opposed end of the other of said stems, a split sleeve consisting of at least two cooperating elements and having inwardly projecting portions on the inner circumferential surface thereof at the opposite ends respectively, said split sleeve being around said reduced diameter stems with the inwardly projecting portions engaging behind the respective flanges, and a sleeve member around the outer circumference of the split sleeve portions for retaining the split sleeve portions in the cylindrical shape, one of said pistons having an axially extending portion adjacent said reduced diameter stem, the diameter of said extending portion being complementary and smaller or equal to the inner diameter of the sleeve member, whereby when coupling the pistons, the sleeve member is positioned on the extending portion beforehand and thereafter is moved axially to surround the split sleeve portions.

2. A master cylinder according to claim 1 in which the split sleeve consists of two co-operating halves.

3. A master cylinder according to claim 1 in which the split sleeve consists of three equally dimensioned elements.

4. A master cylinder according to claim 1 in which, a flange is provided on one end of the split sleeve for abutting with one end of the sleeve member when the sleeve member is moved axially onto the outer circumference of the split sleeve.

* * * * *